(12) United States Patent
Wendig et al.

(10) Patent No.: US 8,397,479 B2
(45) Date of Patent: Mar. 19, 2013

(54) CABLE CARRIER DEVICE AND METHOD FOR PRODUCING AN ELEMENT OF A CABLE CARRIER DEVICE

(75) Inventors: Thomas Wendig, Katzwinkel/Elkhausen (DE); Dirk Schöler, Wilnsdorf (DE); Andreas Böhm, Siegen (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 0 days.

(21) Appl. No.: 13/121,112

(22) PCT Filed: Aug. 5, 2009

(86) PCT No.: PCT/EP2009/060135
§ 371 (c)(1),
(2), (4) Date: Aug. 31, 2011

(87) PCT Pub. No.: WO2010/034557
PCT Pub. Date: Apr. 1, 2010

(65) Prior Publication Data
US 2011/0302900 A1    Dec. 15, 2011

(30) Foreign Application Priority Data

Sep. 26, 2008 (DE) .......................... 10 2008 049 246

(51) Int. Cl.
*F16G 13/02* (2006.01)
(52) U.S. Cl. ................. 59/78.1; 59/900; 248/49; 248/51
(58) Field of Classification Search .................... 59/78.1, 59/900; 248/49, 51
See application file for complete search history.

(56) References Cited

U.S. PATENT DOCUMENTS

| 5,020,313 | A  | * | 6/1991 | Moritz et al. | 59/78.1 |
| 6,226,973 | B1 | * | 5/2001 | Wehler | 59/78.1 |
| 6,550,232 | B1 | * | 4/2003 | Achs et al. | 59/78.1 |
| 7,047,720 | B2 | * | 5/2006 | Ikeda et al. | 59/78.1 |
| 7,392,650 | B2 | * | 7/2008 | Utaki et al. | 59/78.1 |
| 7,536,849 | B2 | * | 5/2009 | Wehler et al. | 59/78.1 |
| 8,225,704 | B2 | * | 7/2012 | Ogrin et al. | 89/36.02 |

FOREIGN PATENT DOCUMENTS

| DE | 20313163 | 1/2004 |
| DE | 202006019022 | 2/2007 |
| EP | 1898430 | 3/2008 |

\* cited by examiner

*Primary Examiner* — David B Jones
(74) *Attorney, Agent, or Firm* — BainwoodHuang

(57) ABSTRACT

An element is provided for a cable carrier device which is constructed and arranged to carry cabling components such as cables, lines, hoses and the like between a first connection point and a second connection point. The element is formed from a material including at least one plastic and a filler. The filler includes three-dimensional geometrical carbon-based structures having nanometer-scale dimensions. In some arrangements, the carbon-based structures are carbon nanotubes formed of carbon atoms. Accordingly, the element is capable of dissipating electrostatic charges of the cable carrier device. Thus, the corresponding cable carrier device is suitable for working environments that are to be protected from electrostatic effects.

12 Claims, 4 Drawing Sheets

Figure 1:
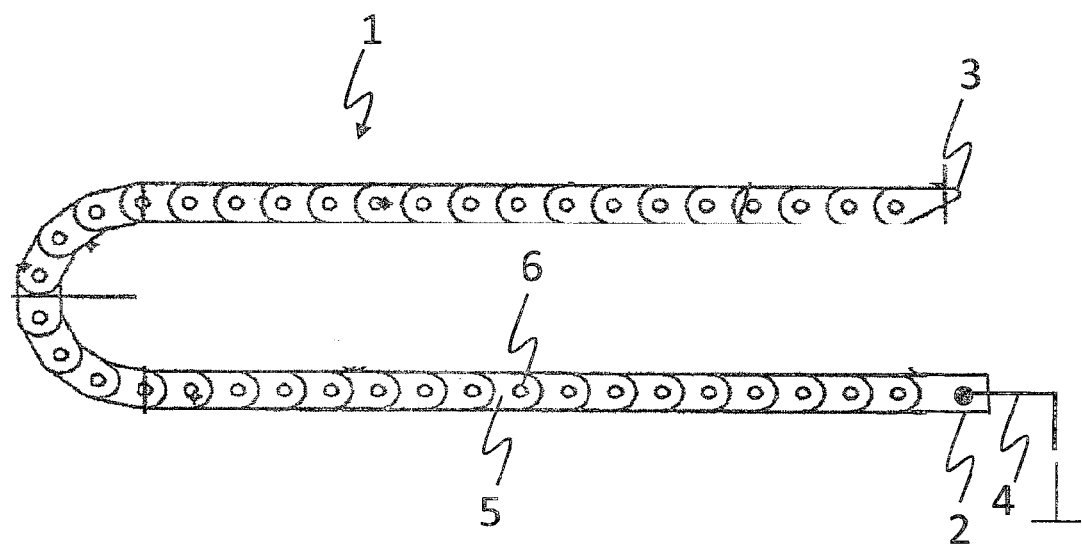

CABLE CARRIER DEVICE AND METHOD FOR PRODUCING AN ELEMENT OF A CABLE CARRIER DEVICE

An embodiment of the present invention concerns an element for a cable carrier device for carrying cables, lines, hoses and the like (collectively, cabling components), which is also referred to as an energy chain, and to a corresponding cable carrier device. Furthermore, a method for producing an element of a cable carrier device is proposed.

Cable carrier devices are used for carrying cables, lines, hoses and the like between a first and a second connection point. At least one of the connection points is movable, for example mobile. For example, tools, machines and the like may be supplied with power, compressed air, hydraulic or pneumatic pressure, control signals and the like. Furthermore, data may also be passed from the movable connection to the fixed connection.

There are areas in which an electrostatic charge of the cable carrier device, produced for example by friction when the cable carrier device moves, is problematic, for example in the production and/or handling of semiconductor devices and/or electronic components or in the production and/or handling of plastic and/or glass. In order to prevent the components from being damaged here and/or to make handling possible, it is necessary to dissipate the electrostatic charge of the cable carrier device. Cable carrier devices are often composed of multiple elements, such as for example chain links of plastic, which has such a low electrical conductivity that dissipation of the electrostatic charge is not possible.

For this reason, the present invention is based on the object of providing an element of a cable carrier device, a cable carrier device and a corresponding production method with which the disadvantages known from the prior art can be at least improved and, in particular, of providing an element for a cable carrier device, a cable carrier device and a corresponding production method with which dissipation of the static charge can take place during operation.

These objects are achieved various methods and apparatus which are described herein. There are some arrangements which are directed at advantageous developments.

The element according to the invention of a cable carrier device for carrying cables, lines, hoses and the like between a first and a second connection point is formed from a material comprising at least one plastic and a filler. According to the invention, the filler comprises three-dimensional geometries with dimensions on the nanometer scale, which preferably comprise carbon atoms or are composed of carbon atoms. With particular preference, they are carbon nanotubes.

Three-dimensional geometries are understood in particular as meaning carbon-based structures of a specific three-dimensional arrangement, the dimensions of which are in the nanometer range. Carbon nanotubes are understood as meaning structures of carbon atoms which represent three-dimensional tube-like formations. Carbon nanotubes can usually be characterized by a chiral vector R, which can be represented as R=ma+nb. Here, m and n are natural numbers. The vectors a and b describe the unit cell of a single graphite plane. Carbon nanotubes are understood here in particular as meaning chiral armchair and/or zigzag carbon nanotubes. Furthermore, the term carbon nanotubes is also understood in particular as meaning so-called double- and multi-wall carbon tubes (DWNT, double wall nanotubes, and MWNT, multi wall nanotubes). In this case, the tubes lie concentrically over or in one another.

Adding carbon nanotubes to the plastic when forming elements of cable carrier devices for carrying cables, lines, hoses and the like and corresponding cable carrier devices produces an increase in the electrical conductivity of the material of the cable carrier devices and a reduction in the corresponding electrical resistance. The term cable carrier device is understood here has also including so-called energy chains, which may be formed for example by arranging a number of chain links in series or else by connecting various components to a base component. Here, an element of a cable carrier device is understood in particular as meaning a chain link plate, a cross bar, a chain link, connecting elements for chain links, carrying elements for chain links and the like.

The increased electrical conductivity allows electrostatic charges to be dissipated. These electrostatic charges may be produced, for example, during the operation of the cable carrier devices between a first, fixed connection point and a second, movable connection point or between two movable connection points. The way in which the element of a cable carrier device is configured according to the invention allows a corresponding cable carrier device also to be used in so-called ESD areas (ESD—electrostatic discharge) or in so-called ESD-protected areas. This concerns, for example, the production, machining and packaging of semiconductor devices, plastic elements, in particular plastic film or sheet, paper, textiles and/or glass.

According to an advantageous configuration, the filler comprises carbon fibers.

Therefore, the use of a mixture of carbon fibers and carbon nanotubes is preferred as the filler. Mixing ratios of 25% by weight of filler, in particular 20% by weight of carbon fibers, and 5% by weight of carbon nanotubes are preferred here.

According to a further advantageous configuration, the proportion of filler is at least 10% by weight.

This means that the element, such as for example a chain link, is produced from a material comprising at most 90% by weight of plastic, such as for example PA 66, and at least 10% by weight of filler, in particular a mixture of carbon nanotubes and carbon fibers. Preferred here is the use of a filler with a proportion of 21 to 30% by weight, comprising 20% by weight of carbon fibers and 1 to 10% by weight of carbon nanotubes. The following compositions have been found to be particularly advantageous:

| % by wt of plastic | % by wt of filler |
|---|---|
| 80 | 20 |
| 60 | 40 |

According to a further advantageous configuration, the material from which the cable carrier device is formed meets at least one of these conditions:
a) a tensile strength of more than 150 MPa (megapascals)
b) a tensile modulus of more than 9000 MPa;
c) a flexural strength of more than 175 MPa; and
d) a modulus of elasticity of more than 9000 MPa.

A material which has met at least one of the aforementioned conditions a) to d) and, in particular, at least two of these conditions, has proven to be particularly advantageous in the formation of elements of cable carrier devices and of cable carrier devices that also withstand the loads occurring in continuous operation.

According to a further advantageous configuration, the filler is of a homogeneously distributed form.

This means in particular that the filler content varies over the element of the cable carrier device by at most 0.5%. This allows a reduction in the overall electrical resistance of the element and of the cable carrier device to be achieved.

According to a further advantageous configuration of the element according to the invention of a cable carrier device, the filler content is spatially inhomogeneous.

In particular, it is preferred to form the filler with a greater concentration near the surface. Thus, possible configurations of the element according to the invention and of the cable carrier device according to the invention are ones in which the respective inner regions of the element or of the cable carrier device that are not in contact with the surface are virtually free of filler, while the regions near the surface have a relatively high filler content.

Also proposed is a cable carrier device for carrying cables, lines, hoses and the like between a first and a second connection point that comprises at least one element according to the present invention.

Here, the chain links or parts of the chain links may, for example, be formed as elements according to the present invention. It is also possible, for example, to form as an element according to the invention a carrying strip, to which corresponding further elements that together form the cable carrier device are connected. These further elements may alternatively or additionally be formed according to the present invention.

According to an advantageous configuration of a cable carrier device according to the invention, the cable carrier device establishes an electrically conducting connection between the connection points.

It is thus possible to dissipate an electrostatic charge caused by friction, for example when the cable carrier device is being moved.

Also particularly advantageous is a configuration in which at least one connection point, preferably a static, fixed connection point, is grounded. Alternatively or additionally, grounding of the cable carrier device is also possible, for example by grounding at least one chain link.

According to a further advantageous configuration of the cable carrier device according to the invention, an electrical resistance of the cable carrier device is less than $1 \cdot 10^8$ ohms.

A correspondingly lower electrical resistance leads to a good capability for dissipating electrostatic charges. This may be achieved in particular by establishing electrical connections between neighboring elements, such as for example chain links of the cable carrier device. A corresponding formation with fillers may be preferred, particularly in the regions effecting the connection of neighboring chain links and regions connecting these regions.

According to a further aspect of the present invention, a method for producing at least one element of a cable carrier device in which the element is produced from at least one plastic and a filler comprising carbon nanotubes is proposed.

In principle, the term plastic is also understood as meaning a fiber-reinforced plastic, in particular a fiber-reinforced plastic. Apart from plastic nanotubes, the filler may comprise further substances, such as for example also carbon fibers.

An element of a cable carrier device may be, for example, a chain link, a chain link plate, a transverse member and/or a cross bar of a chain link. Furthermore, the term element of a cable carrier device is also understood as meaning, for example, a base element of the cable carrier device in strip form to which further elements can be connected.

According to an advantageous configuration of the method according to the invention, the element is injection-molded.

According to a further advantageous configuration of the method according to the invention, the element is extruded.

According to a further advantageous configuration of the method according to the invention, at least one region of the element of the cable carrier device is formed with a coating comprising carbon nanotubes.

It is thus possible to form regions near the surface of the element of a cable carrier device with carbon nanotubes, while further regions lying therebelow of the cable carrier device, such as for example so-called base elements or inserts, may be formed without any carbon nanotubes.

According to a further advantageous configuration of the method according to the invention, a multi-component injection-molding process is used.

Thus, components may be produced in particular by means of a two-component injection-molding process.

Figure 2:
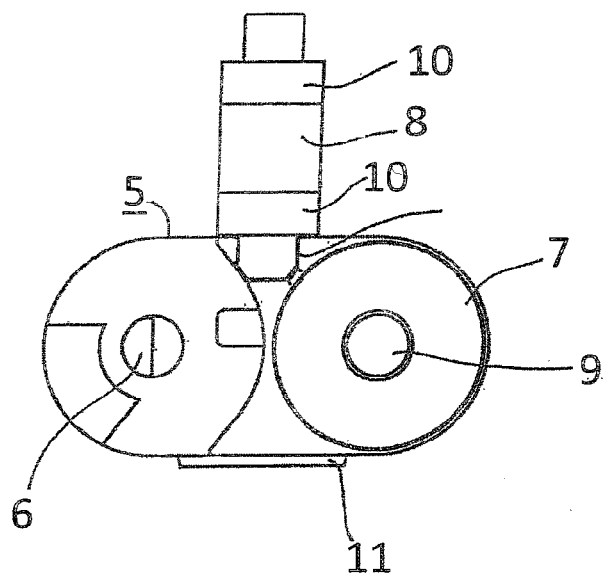
Figure 3:
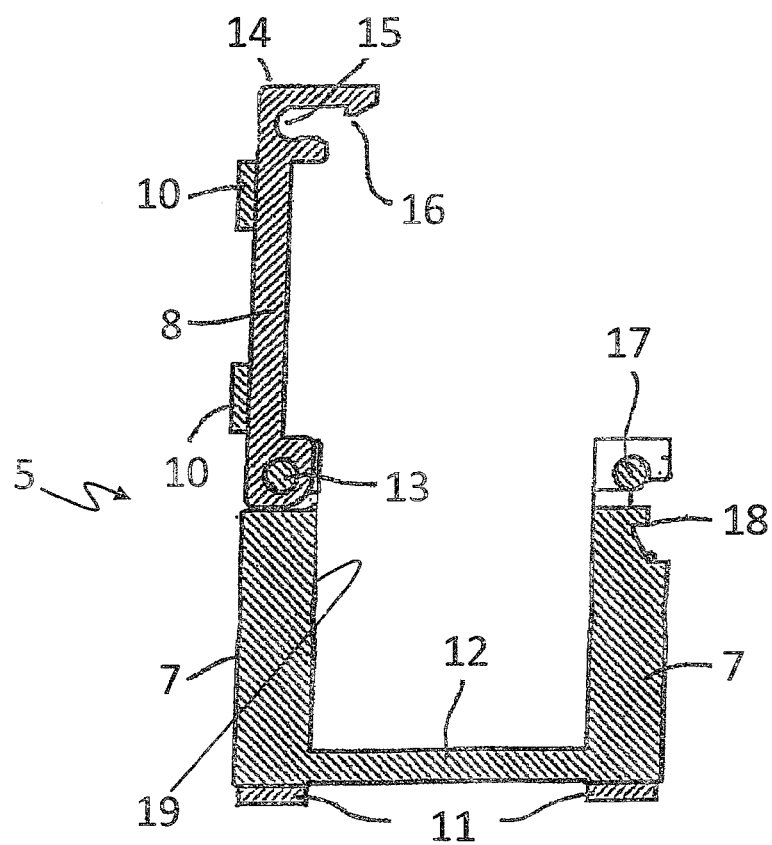
Figure 4:
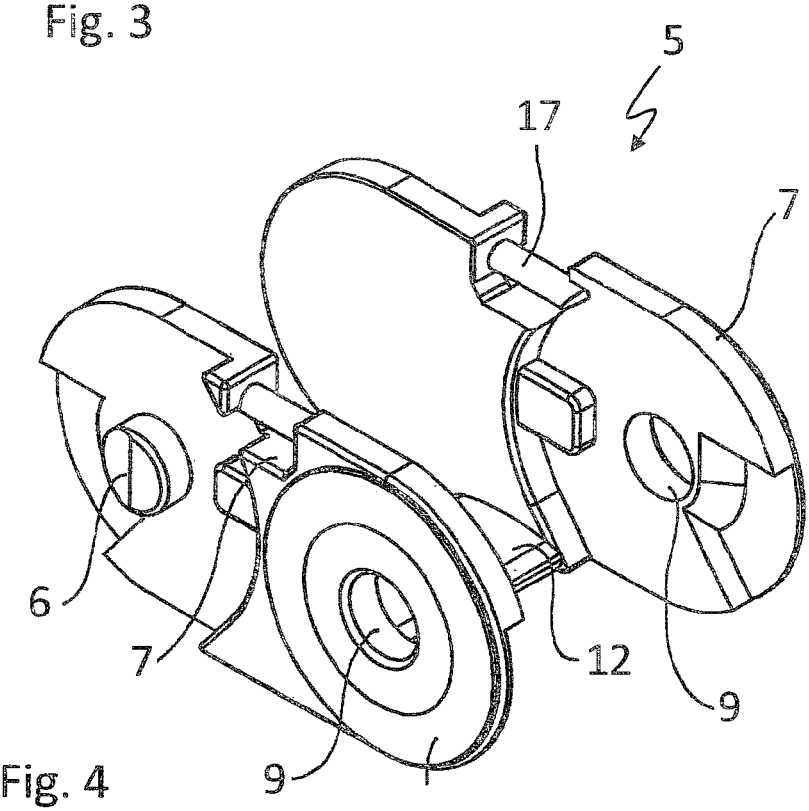
Figure 5:
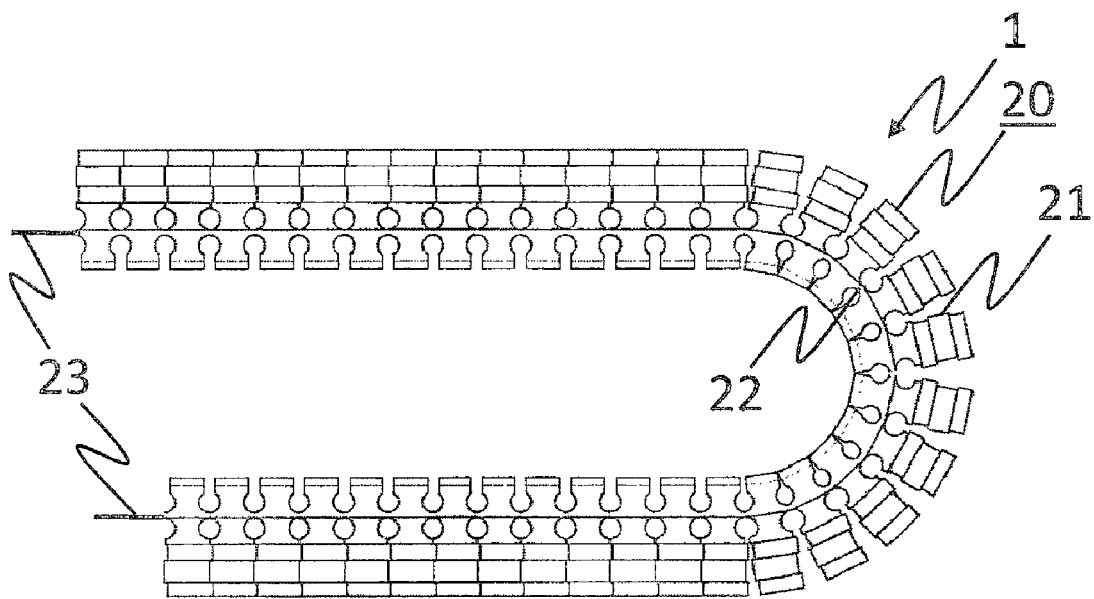
Figure 6:
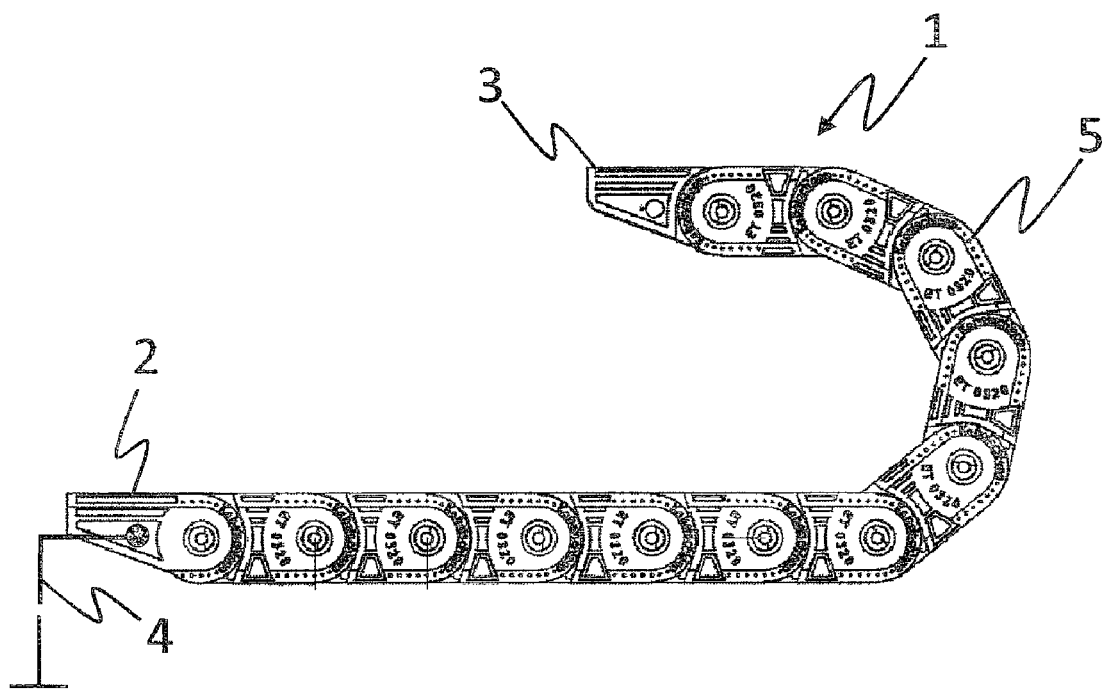
Figure 7:
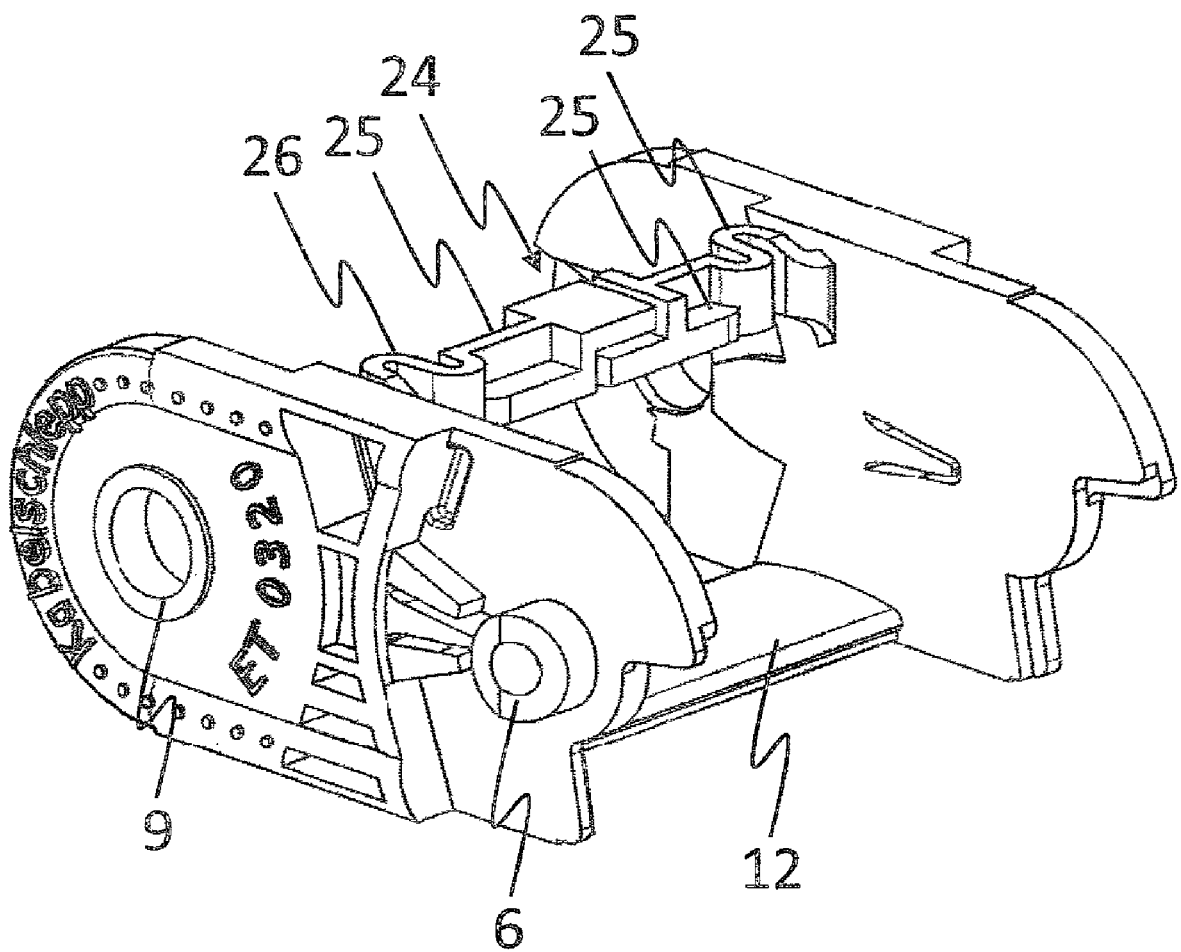

The details and advantages that are disclosed for the element according to the invention of a cable carrier device according to the invention and for the cable carrier device according to the invention can each be applied and transferred to one to the other and to the method according to the invention, and vice versa in each case. The invention is explained in more detail below with reference to the accompanying drawings, without being restricted to the details shown there. The figures schematically show:

FIG. 1 a first exemplary embodiment of a cable carrier device according to the invention;

FIG. 2 a first view of an element according to the invention of the first exemplary embodiment of a cable carrier device;

FIG. 3 a second, schematic, view of an element according to the invention of the first exemplary embodiment of a cable carrier device according to the invention;

FIG. 4 a perspective view of an element according to the invention of the first exemplary embodiment of a cable carrier device; and FIG. 5 a lateral view of a second exemplary embodiment of a cable carrier device according to the invention;

FIG. 6 a lateral view of a third exemplary embodiment of a cable carrier device according to the invention; and FIG. 7 a perspective view of an element of the third exemplary embodiment of a cable carrier device according to the invention.

FIG. 1 schematically shows a first exemplary embodiment of a cable carrier device 1 according to the invention in side view. This cable carrier device 1 serves for carrying inside it cables, lines, hoses and the like between a first connection point 2 and a second connection point 3. In this exemplary embodiment, the first connection point 2 is fixed in place, while the second connection point 3 is movable. It is likewise possible that both the first connection point 2 and the second connection point 3 are movable. In the present exemplary embodiment, the second connection point 3 is formed on a machine not represented any more specifically, so that said machine can be supplied by way of the cable carrier device with, for example, power, control signals, compressed air, water, consumable medium, suction for extraction, etc. and, correspondingly, data can also be transferred from the machine.

According to the present invention, the cable carrier device 1 is formed from elements, to be specific chain links 5, of a plastic or a filler. In particular, the plastic is a glass-fiber reinforced plastic and the filler comprises carbon nanotubes.

The first connection point 2 is connected to ground 4. During the operation of the cable carrier device, the second connection point 3 is moved with respect to the first connection point 2. This leads to a rolling movement of the cable carrier device 1. The cable carrier device 1 is formed by individual chain links 5. These chain links 5 are connected to one another by corresponding pins 6. Neighboring chain links 5 can be pivoted with respect to one another.

The way in which the cable carrier device 1 or the chain links 5 is/are embodied according to the invention makes it possible to dissipate a possibly existing electrostatic charge of the cable carrier device 1 to ground 4 by the lowered electrical resistance in comparison with cable carrier devices 1 that are not according to the invention. This allows the cable carrier device 1 according to the invention also to be used in areas where an electrostatic charge can lead to consequential damage to neighboring components.

FIG. 2 schematically shows an element according to the invention, a chain link 5. A chain link 5 in each case comprises two chain link plates 7. These chain link plates 7 are formed parallel to one another and are connected to one another by at least one cross bar 8. Apart from the pin 6, each chain link plate 7 also has a corresponding bore 9. The pin 6 and the bore 9 of the chain link plate 7 are formed such that neighboring chain link plates 7 can be connected to one another by inserting the pin 6 into the bore 9. The cross bars 8 may be formed such that they can be pivoted with respect to the chain link plate 7 or such that they can be or are firmly connected to it. In the present exemplary embodiment, in the region of the cross bar 8 the chain link 5 has rests 10, the upper side of which can lie on the lower side of the cable carrier device 1 in cases where the cable carrier device is not guided by a guiding device such as a guiding channel.

Furthermore, the chain link plate 7 has sliding shoes 11, by means of which the cable carrier device 1 is movable on a correspondingly formed guiding device or a part of the cable carrier device 1 lying thereunder. In principle it is preferred for the sliding shoes 11 to be formed from a different plastic than the rest of the chain link plate 7 or the chain link 5, for example to reduce noise.

It is possible within the scope of the present invention to provide an increased concentration of the filler particularly in specific regions, or to provide a concentration of the filler exclusively there. These are preferably regions such as, for example, the pin 6, the bore 9, the rest 10 and the sliding shoe 11. Within a chain link 5, the regions lying in between may also be formed with a corresponding concentration of fillers, or by a metallic insert, in such a way that dissipation to ground 4 of an electrostatic charge possibly occurring is possible through these regions.

FIG. 3 schematically shows a further view of a chain link 5 for constructing a cable carrier device 1 according to the invention. This chain link 5 has a formed-on lower cross bar 12, and a pivotable upper cross bar 8. The pivotable cross bar 8 is pivotable about a stud 13. The opposite connecting end 14 of the cross bar 8 has a stud receptacle 15 and a detent 16. Furthermore, the chain link 5 has a stud 17, which is formed in a way corresponding to the stud receptacle 15. Also formed is a projection 18, which corresponds to the corresponding detent 16. The chain link 5 defines a receiving space 19, in which cables, lines, hoses and the like can be carried. This receiving space 19 can be confined by closing the upper pivotable cross bar 8, so that loss of the carried cables, lines, hoses and the like can be prevented.

FIG. 4 shows a perspective view of a chain link 5 according to the invention. According to the invention, individual partial regions of the chain link 5, such as for example the pin 6, the cross bar 8, the stud 17, the chain link plates 7, the bore 9, the sliding shoe 11 and/or the rest 10, are formed with an increased concentration of filler in the form of at least carbon nanotubes, in order in this way to establish an electrical connection between the individual chain links or the cable carrier device 1 and ground 4.

FIG. 5 shows an element 20 of a second exemplary embodiment of a cable carrier device 1 according to the invention, which is not formed from individual chain links but is formed in one piece from a plastic. The appropriate articulating capability of the cable carrier device 1 is provided by corresponding incisions 21 and pivot pins 22. The second exemplary embodiment of a cable carrier device 1 may be formed by a single corresponding element 20 or by a number of elements 20 connected to one another.

The element 20 is formed from a plastic and a filler comprising carbon nanotubes. The elements 20 also comprises a tension element 23, which is formed from wire. It is preferred for the element 20 to be designed such that the carbon nanotubes allow dissipation of the electrostatic charge to the tension element 23, which is correspondingly grounded.

FIG. 6 shows a third exemplary embodiment of a cable carrier device 1 according to the invention. This is made up of chain links 5, which are shown in detail in FIG. 7. The same parts are provided here with the same designations. The third exemplary embodiment shows here a formed-on cross bar 12 and a two-part cross bar 24 comprising two part-bars 25. These part-bars 25 are pivotable against a restoring force about corresponding pivot pins 26.

The element according to the invention of a cable carrier device 1, the cable carrier device 1 according to the invention and the element produced according to the invention of a cable carrier device 1 can be advantageously used for dissipating electrostatic charges of the cable carrier device 1. Thus, corresponding cable carrier devices 1 can also be used in working environments that are to be protected from electrostatic effects.

| List of designations | |
|---|---|
| 1 | cable carrier device |
| 2 | first connection point |
| 3 | second connection point |
| 4 | ground |
| 5 | chain link |
| 6 | pin |
| 7 | chain link plate |
| 8 | cross bar |
| 9 | bore |
| 10 | rest |
| 11 | sliding shoe |
| 12 | formed-on cross bar |
| 13 | stud |
| 14 | connecting end |
| 15 | stud receptacle |
| 16 | detent |
| 17 | stud |
| 18 | projection |
| 19 | receiving space |
| 20 | element |
| 21 | incision |
| 22 | pivot pin |
| 23 | tension element |
| 24 | two-part cross bar |
| 25 | part-bar |
| 26 | pivot pin |

The invention claimed is:

1. An element of a cable carrier device for carrying cabling components between a first and a second connection point, the element being formed from a material comprising at least one plastic and a filler, wherein the filler comprises three-dimensional geometrical carbon-based structures with dimensions on a nanometer scale.

2. The element as claimed in claim 1 wherein the three-dimensional geometrical carbon-based structures with dimensions on the nanometer scale include carbon nanotubes, each carbon nanotube being a three-dimensional tube-shaped formation of carbon atoms.

3. The element as claimed in claim 2, in which the filler further comprises carbon fibers.

4. The element as claimed in claim 2, in which the proportion of filler is at least 10% by weight.

5. The element as claimed in claim 2, in which the material meets at least one of the following conditions:
   a) a tensile strength of more than 150 MPa (megapascals)
   b) a tensile modulus of more than 9000 MPa;
   c) a flexural strength of more than 175 MPa; and
   d) a modulus of elasticity of more than 9000 MPa.

6. The element as claimed in claim 2, in which the filler is of a homogeneously distributed form.

7. The element as claimed in claim 2, in which the filler content is spatially inhomogeneous.

8. A cable carrier device for carrying cabling components between a first and a second connection point, comprising at least one element, each element being formed from a material comprising at least one plastic and a filler,
   wherein the filler comprises three-dimensional nanometer-sized carbon-based structures.

9. The element as claimed in claim 8 wherein the three-dimensional nanometer-sized carbon-based structures include carbon nanotubes, each carbon nanotube being a three-dimensional tube-shaped formation of carbon atoms.

10. The cable carrier device as claimed in claim 9, in which the cable carrier device establishes an electrically conducting connection between the connection points.

11. The cable carrier device as claimed in claim 9, in which at least one connection point is grounded.

12. The cable carrier device as claimed in claim 9, in which an electrical resistance of the cable carrier device is less than $1 \cdot 10^8$ ohms.

* * * * *